United States Patent [19]

Chou

[11] Patent Number: 5,631,627
[45] Date of Patent: May 20, 1997

[54] CONTROL CIRCUIT FOR CENTER HIGH MOUNTED BRAKE LIGHTS

[76] Inventor: Yung-kuei Chou, No. 24, Alley 1, Lane 28, Sec. 5, Hsinyi Rd., Taipei, Taiwan

[21] Appl. No.: 570,780

[22] Filed: Dec. 12, 1995

[51] Int. Cl.$^6$ ..................... B60Q 1/44
[52] U.S. Cl. .......... 340/479; 340/464; 340/466; 340/472; 307/10.8
[58] Field of Search .................. 340/479, 441, 340/466, 467, 464, 472; 307/10.8; 362/276

[56] References Cited

U.S. PATENT DOCUMENTS

| | | | |
|---|---|---|---|
| 4,638,289 | 1/1987 | Zottnik | 340/436 |
| 4,807,101 | 2/1989 | Milde, Jr. | 340/472 |
| 4,841,276 | 6/1989 | Abel et al. | 340/466 |
| 5,172,095 | 12/1992 | Scott | 340/479 |
| 5,404,130 | 4/1995 | Lee et al. | 340/479 |

*Primary Examiner*—Jeffery Hofsass
*Assistant Examiner*—Davetta Woods
*Attorney, Agent, or Firm*—Welsh & Katz, Ltd.

[57] ABSTRACT

A control circuit for a center high mounted brake light of an automobile includes a tachometer for generating a voltage signal in response to a speed of the automobile, a preamplifier for amplifying the voltage signal from the tachometer to a predetermined voltage range, a voltage-controlled oscillator for outputting an oscillating signal in proportion to the voltage signal from the preamplifier, and a flicker circuit having a frequency divider for receiving the oscillating signal from the voltage-controlled oscillator and flickering the brake light in accordance with an output signal of the frequency divider.

3 Claims, 2 Drawing Sheets

CONTROL CIRCUIT FOR CENTER HIGH MOUNTED BRAKE LIGHTS

BACKGROUND OF THE INVENTION

The present invention relates to a control circuit for brake lights of a car, and particularly to a control circuit in connection with a center high mounted brake light.

For many years, safety aspects of car signalization on the roads have been subject to efforts of improvement. A Center High Mounted Brake Light (CHMBL) is a most recent solution that is continuously improving the signaling of the vehicle on overcongested roads.

However, the CHMBL merely may be used to alert a driver of a first vehicle immediately behind a second vehicle of a braking situation that second vehicle such brake lights cannot help the driver of the first vehicle distinguish whether there is to be an imminent change in speed of the second vehicle in front of him.

SUMMARY OF THE INVENTION

An object of the present invention is to provide a brake light activation device to illuminate the brake light to flicker in a specific frequency when a sudden braking occurs.

According to the present invention, a control circuit for a center high mounted brake light of an automobile comprises a tachometer for generating a voltage signal in response to a speed of the automobile, a preamplifier for amplifying the voltage signal from the tachometer to a predetermined voltage range, a voltage-controlled oscillator for outputting an oscillating signal in proportion to the voltage signal from the preamplifier, and a flicker circuit having a frequency divider for receiving the oscillating signal from the voltage-controlled oscillator and flickering the brake light in accordance with an output signal of the frequency divider.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
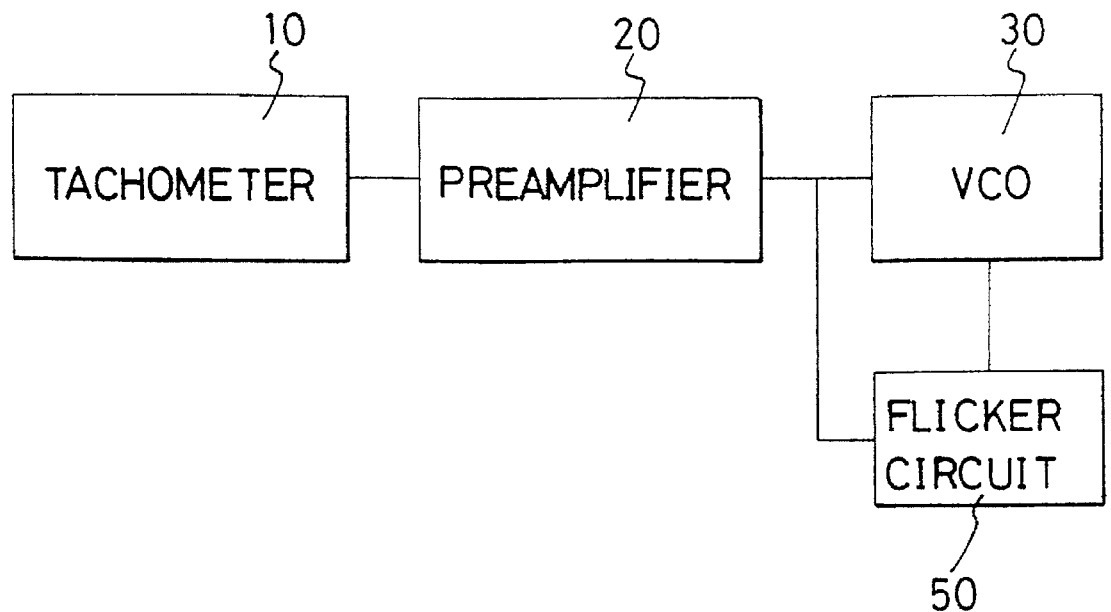
FIG. 1 is a block diagram of a control circuit for a center high mounted brake light according to the present invention.

Referring to FIG. 1, the control circuit for a center high mounted brake light of an automobile in accordance with the present invention includes a tachometer 10 for generating a voltage signal in response to a speed of the automobile, a preamplifier 20 for amplifying the voltage signal from the tachometer 10 to a predetermined voltage range, a voltage-controlled oscillator 30 for outputting an oscillating signal in proportion to the voltage signal from the preamplifier 20, and a flicker circuit 50 receiving the oscillating signal from the voltage-controlled oscillator 30 and flickering the brake light in accordance with the oscillating signal from the voltage-controlled oscillator 30.

Figure 2:
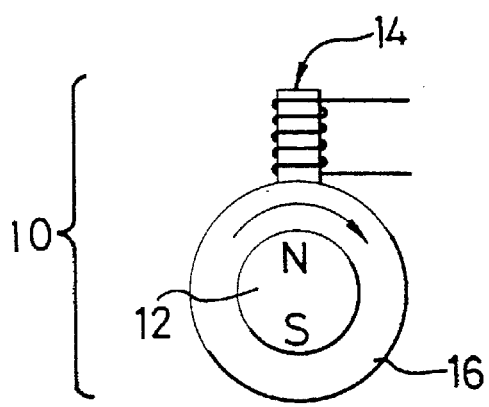
FIG. 2 is a schematic view of a tachometer of the control circuit of FIG. 1.

An shown in FIG. 2, the tachometer 10 includes a permanent magnet 12 secured on a rotary shaft of a transmission gear box 16 and a winding 14 mounted on the gear box 16 for generating a voltage signal in proportional to an angular speed of the shaft. The equation for the generated voltage by the tachometer 10 is represented by:

$$V = K \ast n$$

Wherein V represents the generated voltage, K is a proportionality constant which depends on the construction details (rotor length, rotor diameter, etc.), n is the angular speed measured in revolutions per minute.

Figure 3:
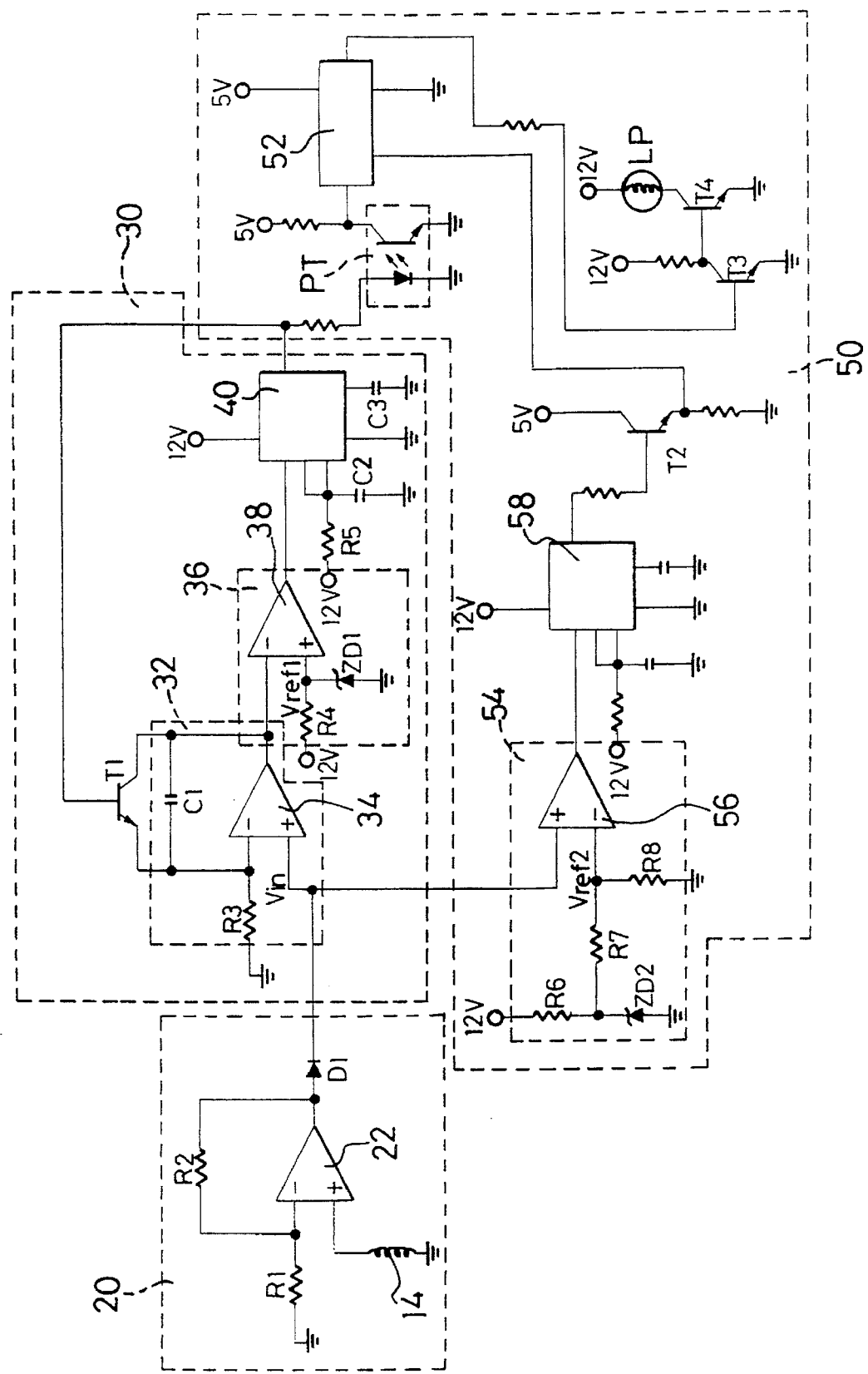
FIG. 3 is a detailed circuit diagram of the control circuit of FIG. 1.

The detailed circuit diagram of the control circuit of the present invention is shown in FIG. 3. The control circuit includes a preamplifier 20, a voltage-controlled oscillator 30, and a flicker circuit 50. The preamplifier 20 is composed of an operational amplifier (OP) 22, a resistor R1, and a resistor R2 for amplifying the voltage signal induced in the winding 14 in FIG. 2 and a diode D1 for rectifying the amplified signal from the amplifier 22 into a direct current (DC) voltage. In the preferred embodiment, the DC voltage derived from the preamplifier 20 corresponding to the speed of the automobile are:

| | |
|---|---|
| 20 Km/hr | 0.4 (Volts) |
| 40 Km/hr | 0.8 (Volts) |
| 60 Km/hr | 1.4 (Volts) |
| 80 Km/hr | 1.8 (Volts) |
| 100 Km/hr | 2.3 (Volts) |
| 120 Km/hr | 3.1 (Volts) |

The DC voltage from the preamplifier 20 is then transferred into the voltage-controlled oscillator 30 composed of an integrator 32, a comparator 36, a transistor T1, and a monostable multivibrator 40. The integrator 32 is composed of an OP amplifier 34, a resistor R3, and a capacitor C1 and an output voltage Vo thereof is proportional to the amount of time, if the input voltage is a DC signal, an equation (A) representing the relation therebetween is:

$$Vo = Vin + (Vin/R3 \ast C1) \ast t \qquad (A)$$

Wherein Vin corresponds to the DC voltage from the preamplifier 20; R3 stands for the resistance of the resistor R3; t stands for the amount of time; and C1 stands for the capacitance of capacitor C1.

The comparator 36 is composed of an OP amplifier 38 in cooperation with a voltage source, a resistor R4, and a Zener diode ZD1 to define a reference voltage Vref1 to a non-inverting input terminal thereof. The monostable multivibrator 40 includes a resistor R5 and a capacitor C2 for outputting a pulse with a firing time of $Tf = K \ast R5 \ast C2$, wherein K is a constant for the monostable multivibrator 40, R5 is the resistance of the resistor R5, and C2 stands for the capacitance of capacitor C2. An inverting input terminal of the OP amplifier 38 receives the output voltage Vo from the integrator 32 as to compare with the reference voltage Vref1 in the non-inverting input thereof. When the Vo in the inverting input terminal is greater than the Vref1 in the non-inverting input terminal, the output terminal of the OP amplifier 38 will go to negative saturation, this will trigger the monostable multivibrator 40 to output a pulse signal to turn on the transistor T1. This will cause the capacitor C1 to discharge for a duration of Tf. After the capacitor C1 is discharged, the capacitor C1 will continue to charge. Thus, the output voltage Vo of the integrator 32 will increase as previously mentioned. In view of the equation (A), when the output voltage Vo remains at a predetermined value such as Vref1 and the input voltage Vin of the integrator 32 is higher, the amount of time t will be smaller, i.e., a frequency of the pulse of the monostable multivibrator 40 will be higher.

The flicker circuit 50 is composed of a photo coupler PT, a frequency divider 52 receiving a signal from the voltage-controlled oscillator 30 via the photo coupler PT as to divide the frequency of the output pluses of the monostable multivibrator 40 into a frequency range of flickering, a comparator 54, a monostable multivibrator 58 connecting with an output of the comparator 54, a brake lamp LP connected to an output of the frequency divider 52 via two transistors T3, T4. The comparator 54 is composed of an OP amplifier 56 with a non-inverting input terminal receiving the DC voltage from the preamplifier 20, a Zener diode ZD2 in cooperation with three resistors R6, R7, and R8 as to define a reference voltage Vref2 for an inverting input terminal of the OP amplifier 56. Preferably, the reference voltage Vref2 is about 0.8 Volts.

The frequency divider 52 has a disable pin connected to the monostable multivibrator 58 via a transistor T2 so that the frequency divider 52 will stop flickering when the output voltage of the preamplifier 20 is less than 0.8 volts, i.e., the speed of the automobile is lower than 40 Kilometers per hour.

By the above circuit arrangement, a driver immediately behind an automobile applying the present invention may be readily aware of the speed of the automobile in front of him by observing the flickering frequency of the center high mounted brake light as to prevent ramming into that car accidentally should rapid deceleration occur.

Although the invention has been explained in relation to its preferred embodiment, it is to be understood that many other possible modifications and variations can be made without departing from the spirit and scope of the invention as hereinafter claimed.

What is claimed is:

1. A control circuit for a center high mounted brake light of an automobile, comprising:

a tachometer for generating a voltage signal in response to a speed of the automobile;

a preamplifier for amplifying the voltage signal from the tachometer to a predetermined voltage range;

a voltage-controlled oscillator for outputting an oscillating signal in proportion to the voltage signal from the preamplifier; and a flicker circuit having a frequency divider for receiving the oscillating signal from the voltage-controlled oscillator and flickering the brake light in accordance with an output signal of the frequency divider and at a flicker frequency related to the speed of the automobile.

2. A control circuit as claimed in claim 1, wherein said voltage-controlled oscillator includes an integrator.

3. A control circuit as claimed in claim 1, wherein said voltage-controlled oscillator is made from an integrated circuit.

* * * * *